(12) United States Patent
Hashimoto et al.

(10) Patent No.: US 6,204,872 B1
(45) Date of Patent: Mar. 20, 2001

(54) CONTROLLER FOR HANDLING THE SUPPLY AND DISCHARGE OF RECORDING MEDIA

(75) Inventors: Hiroshi Hashimoto, Tokyo; Junichi Kimizuka, Yokohama; Soya Endo, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/293,774

(22) Filed: Apr. 19, 1999

Related U.S. Application Data

(62) Division of application No. 08/768,586, filed on Dec. 18, 1996, which is a continuation of application No. 08/297,918, filed on Aug. 31, 1994, now abandoned.

(30) Foreign Application Priority Data

Aug. 31, 1993 (JP) .................................................. 5-215641
Dec. 27, 1993 (JP) .................................................. 5-330761

(51) Int. Cl.⁷ .................................................. G03G 15/00
(52) U.S. Cl. .................. 347/153; 271/9.01; 271/145; 271/207; 347/164; 347/264; 399/393; 399/405
(58) Field of Search .................................. 399/405, 393, 399/209; 347/218, 262, 139, 153, 264, 164; 271/225, 184, 9.01, 145, 293, 207, 212

(56) References Cited

U.S. PATENT DOCUMENTS

| | | | |
|---|---|---|---|
| 4,351,609 | 9/1982 | Inoue et al. | 355/50 |
| 4,707,111 | * 11/1987 | Inuzuka et al. | 399/209 |
| 4,974,828 | * 12/1990 | Matsuo et al. | 271/293 |
| 5,158,221 | 10/1992 | Hashimoto et al. | 399/16 X |
| 5,227,816 | 7/1993 | Forest | 347/153 |
| 5,327,207 | * 7/1994 | Otake et al. | 271/225 X |
| 5,328,164 | 7/1994 | Soga | 271/270 |
| 5,374,046 | * 12/1994 | Toki et al. | 271/9.01 |
| 5,416,570 | * 5/1995 | Kondou | 347/139 X |
| 5,532,826 | * 7/1996 | Miyao et al. | 399/405 X |
| 5,975,515 | * 11/1999 | Capri et al. | 271/9.01 X |

FOREIGN PATENT DOCUMENTS 4-64573 * 2/1992 (JP) .

\* cited by examiner

*Primary Examiner*—Susan S. Y. Lee
(74) *Attorney, Agent, or Firm*—Fitzpatrick, Cella, Harper & Scinto

(57) ABSTRACT

An image forming apparatus which includes a main body which has a printer engine which forms an image on a recording medium, a supply unit which supplies the recording medium to the main body, and a discharge unit which receives the recording medium, on which an image is recorded, discharged from the main body. The supply unit and discharge unit detachably connect to the apparatus and the units are stackable under the main body, and the supply unit and discharge unit have a relaying device for relaying the recording medium which is supplied or discharged from another unit or the main body.

5 Claims, 15 Drawing Sheets

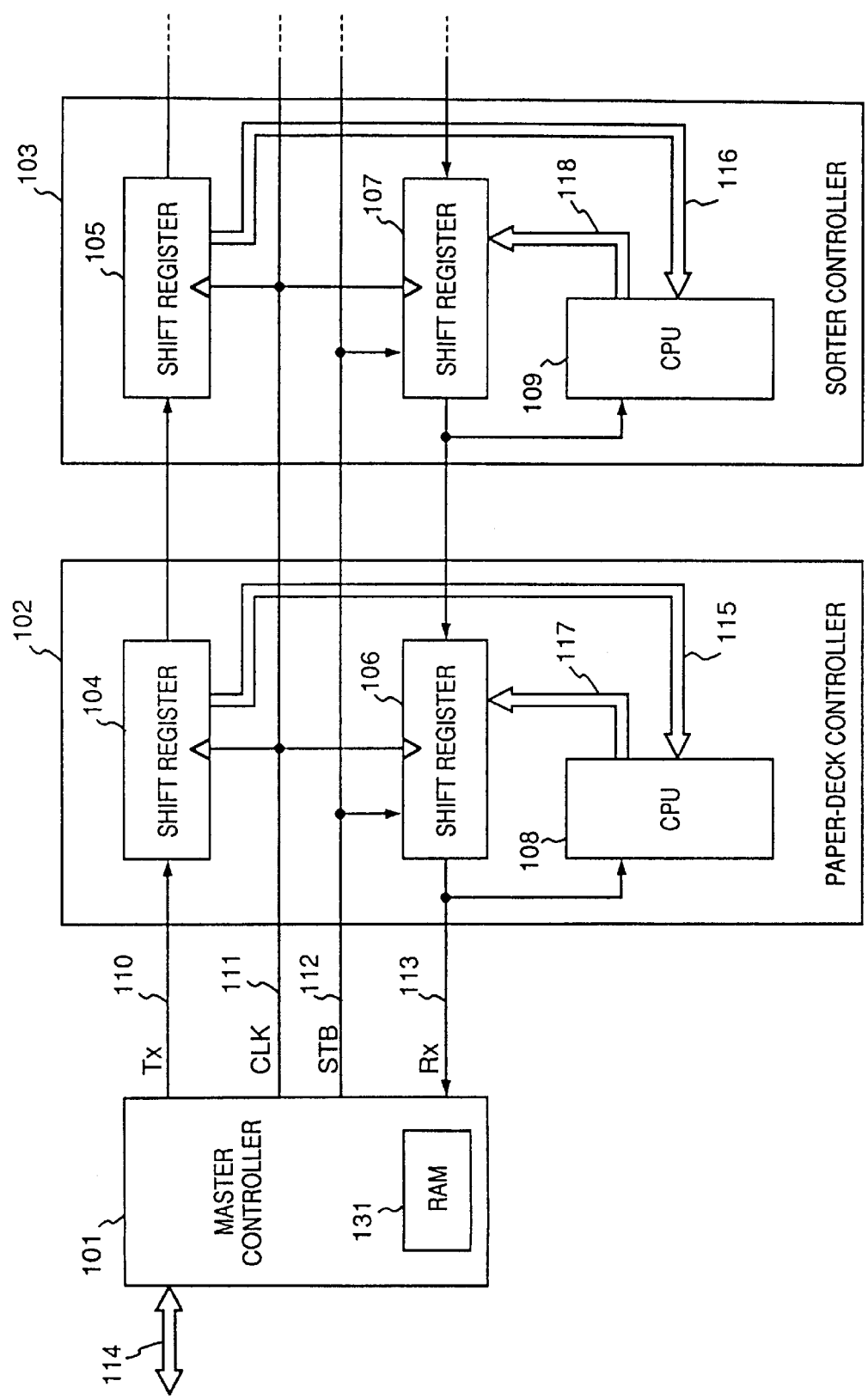

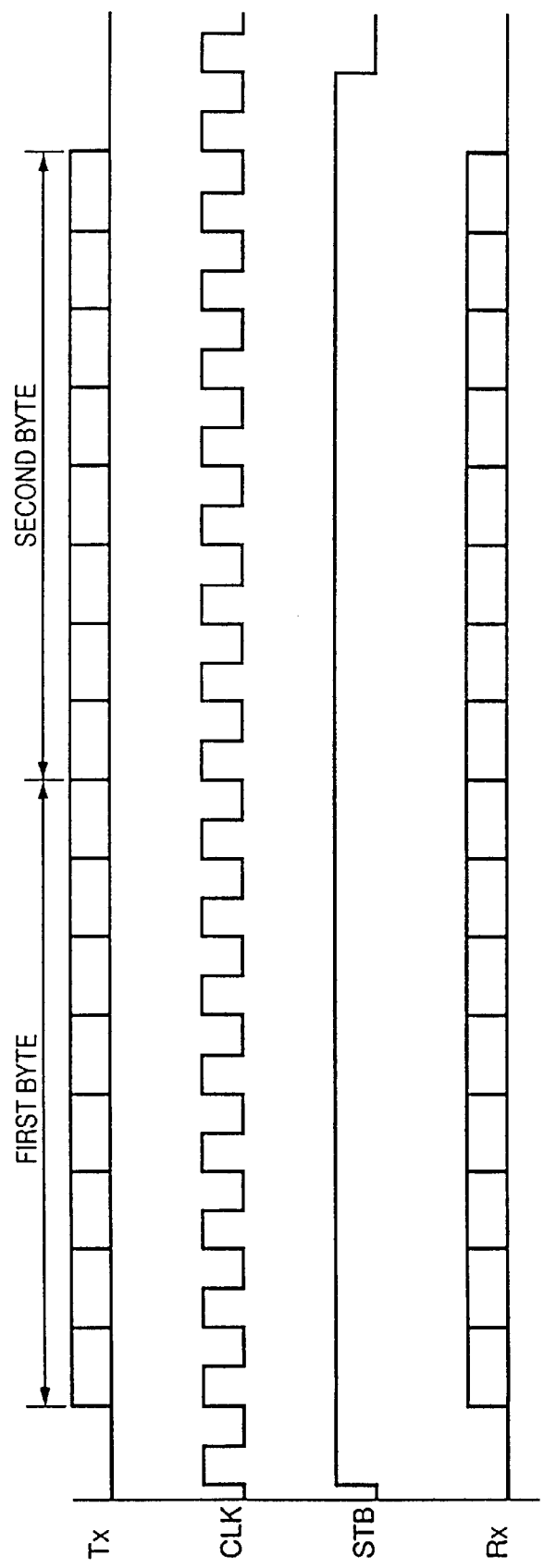

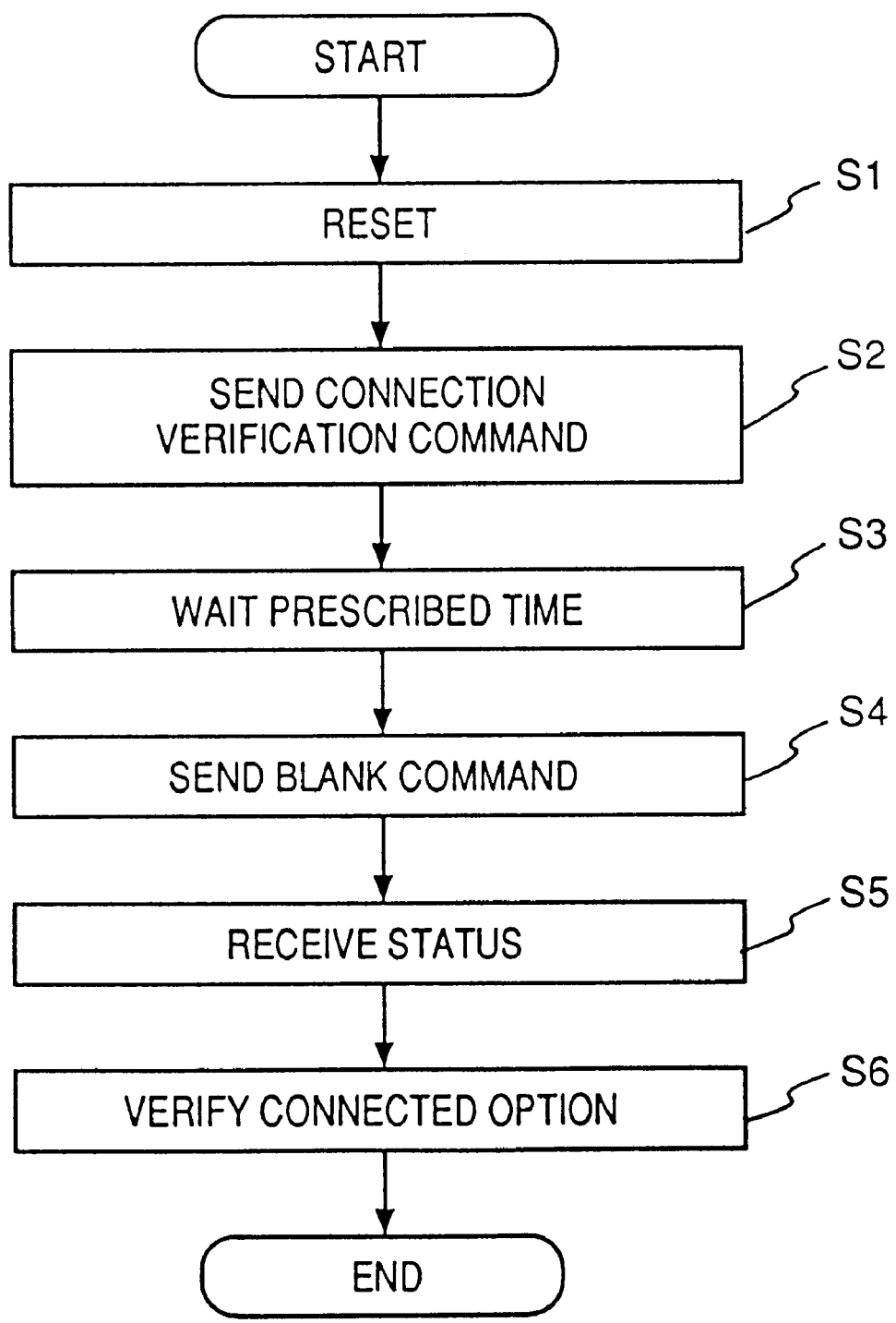

CONTROLLER FOR HANDLING THE SUPPLY AND DISCHARGE OF RECORDING MEDIA

This application is a Division of application Ser. No. 08/768,586 filed Dec. 18, 1996 which is a continuation of application Ser. 08/297,918 filed Aug. 31, 1994 now abandoned.

BACKGROUND OF THE INVENTION

This invention relates to an image recording method and apparatus. For example, the invention relates to control of an optional unit which extends the paper handling function of an image recording apparatus for recording images using an electrophotographic process.

An image recording apparatus such as a laser printer using an electrophotographic process is constructed as shown in FIG. 1. The apparatus has a main body 201 which includes a video controller 202 and an engine controller 203, below.

The video controller 202 mainly is for performing control related to image processing. Specifically, the video controller 202 develops image information into bit data. The image information is sent from an external device (not shown), such as a personal computer, via a general-purpose interface such as a Centronics interface. The engine controller 203 mainly is for controlling corona discharge, exposure, development, transfer, fixing and paper conveyance related to the electrophotographic process. A video interface 204 interconnects the video controller 202 and engine controller 203 to make possible communication between them.

A paper deck option 205 accommodates a large supply of recording paper and supplies the recording paper to the image recording apparatus 201 in response to an instruction from the engine controller 203. A paper deck interface 206 interconnects the engine controller 203 and paper deck option 205 to make possible communication between them.

A sorter option 207 has a plurality of stacking trays for stacking sheets of recording paper, which have been recorded on and discharged from the image recording apparatus 201, while assorting them into prescribed categories in response to an instruction from the engine controller 203. A sorter interface 208 interconnects the engine controller 203 and sorter option 207 to make possible communication between them.

In the arrangement described above, the video controller 202 accepts image information and a print instruction from the external device, whereupon the controller 202 sends the engine controller 203 a video signal, obtained by converting the image information into bit data, as well as the print instruction via the video interface 204. Further, on the basis of a designation made by the user from an operation panel (not shown) connected to the external device or video controller 202, the video controller 202 also transmits a command relating to use of the paper deck option 205 or sorter option 207.

The engine controller 203 controls the components related to tho electrophotographic process, namely the components for corona discharge, exposure, development, transfer, fixing and paper conveyance, within the image recording apparatus 201 and carries out image recording on the basis of the received video signal. At the same time, on the basis of a command from the video controller 202, the engine controller 203 controls the paper deck option 205 via the paper deck interface 206 to designate the timing of paper feed, and controls the sorter option via the sorter interface 208 to designate assorting of the sheets of recording paper.

Various problems are encountered in the art described above.

Specifically, the engine controller 203 is connected to the two optional units 205, 207 in a fixed relationship and this combination cannot be changed. Accordingly, in order to realize control of a new optional unit, the engine controller is additionally provided with a control capability other than that for controlling the electrophotographic process. Further, in order to provide higher functionality, it is necessary to improve the capabilities of the engine controller which will control these functions.

Environments in which image recording apparatus are used have become more diverse in recent years and this diversification has been accompanied by a desire for higher functionality of installed optional units and for the ability to use a wide variety of optional units freely in different combinations. However, in order to make it possible to control such a wide variety of optional units in the arrangement described above, it is necessary to improve the capabilities of the engine controller and add on controlled systems. The result is a rise in the cost of the engine controller. This rise in cost is a meaningless price increase for users who do not intend to employ optional units.

Furthermore, in a case where a plurality of optional units are combined, it is necessary to know the order in which each unit is connected. In addition, since the recording paper is conveyed between optional units at high speed, it is required that instructions for control of paper conveyance be sent to the plurality of optional units simultaneously and at high speed.

SUMMARY OF THE INVENTION

Accordingly, an object of the present invention is to provide an image recording apparatus provided with a master controller, in addition to the video controller and engine controller, for overall control of a variety of optional units, means whereby the video controller applies instructions directly to the master controller, and means for notifying the video controller and master controller of timing signals from the engine controller relating to paper discharge and paper feed, thereby making it possible to use a variety of optional units freely in any combination without restrictions being imposed by the functions of the engine controller.

According to the present invention, the foregoing object is attained by providing an image recording apparatus comprising control means for generating an image signal from image information based upon a recording instruction, recording means for recording an image based upon the image signal generated by the control means, recording control means for controlling the recording means, and optional-unit control means for controlling at least one optional unit, wherein the control means applies control instructions to the optional-unit control means, without intervention of the recording means, in response to the recording instruction.

Another object of the present invention is to cause means which controls an optional unit to control conveyance of recording paper, thereby freeing the image recording apparatus from control of conveyance of recording paper to a plurality of optional units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram showing the detailed connections between a master controller in FIG. 2 and the controller of each optional unit;

FIG. 5B is a timing chart showing another way of applying strobe signals in FIG. 4;

FIG. 6 is a flowchart showing a procedure for verifying connection of optional units;

DESCRIPTION OF THE PREFERRED EMBODIMENTS

An embodiment of an image recording apparatus according to the present invention will now be described in detail with reference to the drawings.

Figure 1:
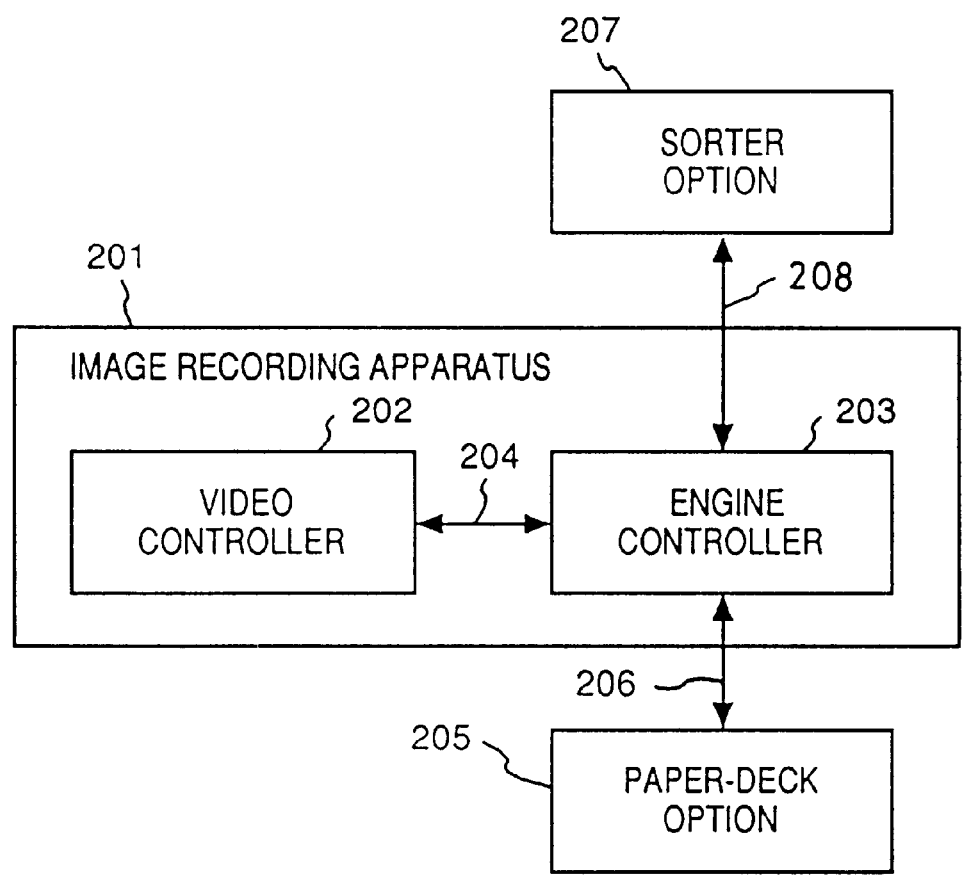
FIG. 1 is a block diagram illustrating the construction of an image recording apparatus such as a laser printer using an electrophotographic process.
Figure 2:
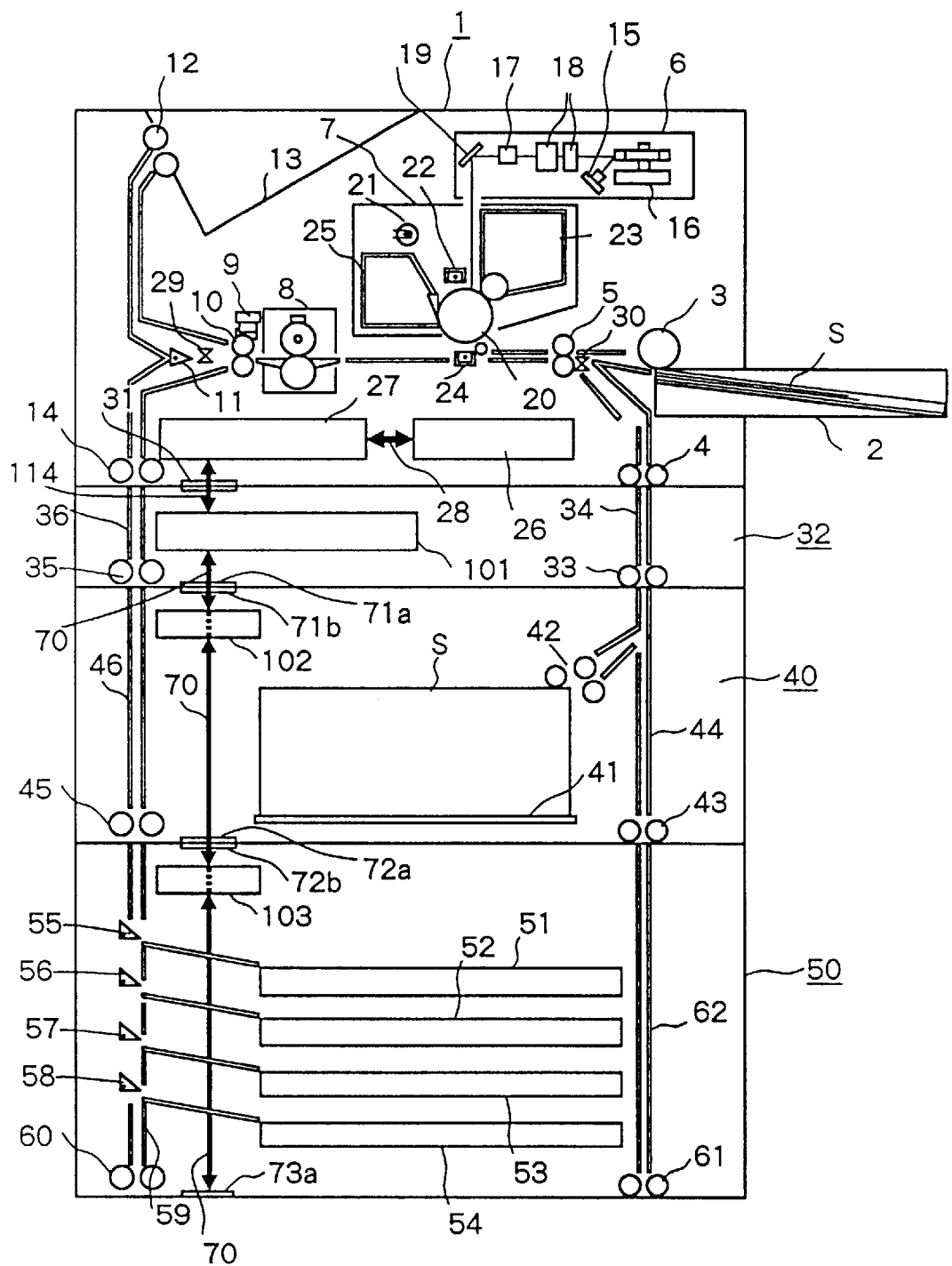
FIG. 2 is a diagram showing the construction of an embodiment of an image recording apparatus according to the present invention.

FIG. 2 is a diagram showing the construction of an image recording apparatus according to the present invention. A laser-beam printer is illustrated in this embodiment by way of example. In the example illustrated, two optional units are connected, though it is possible to connect a large number thereof. Construction and operation will now be described.

Construction

In FIG. 2, numeral 1 denotes the main body of a laser-beam printer in which recording paper S accommodated in a recording paper cassette 2 is supplied to the body 1 by a paper feed roller 3. A pair of resistance rollers 5 for synchronously conveying the recording paper are provided downstream of the feed roller 3, and an image recording section 7 for forming a toner image on the recording paper by laser light from a laser scanner 6 is provided downstream of the resistance rollers 5.

Further, a fixing unit 8 for thermally fixing the toner image formed on the recording paper is provided downstream of the image recording section 7. Provided downstream of the fixing unit 8 are a paper-discharge sensor 9 for sensing the state of recording paper conveyance in a paper discharge section, conveyance rollers 10 for conveying the recording paper, and a flapper 11 for switching the direction in which recording paper, on which recorded has been completed, is conveyed. By switching the flapper 11, the recording paper is stacked on a stacking tray 13 through paper discharge rollers 12 or conveyed to optional paper discharge rollers 14 in order to be conveyed to a paper discharge option.

The laser scanner 6 includes a laser unit 15 for emitting laser light modulated based upon an image signal VDO sent from a video controller 26, described later, a motor 16 for driving a polygon mirror which causes the laser beam from the laser unit 15 to scan a photosensitive drum 20, a beam detector 17 for detecting the position of the laser beam in the scanning direction, an imaging lens group 18 and a folded mirror 19.

The image recording section 7 includes elements necessary for a well-known electrophotographic process, namely the photosensitive drum 20, a pre-exposure lamp 21, a primary corona discharge device 22, a developing unit 23, a transfer corona discharge device 24 and a cleaner 25.

An engine controller 26 controls the electrophotographic process involving the laser scanning section 6, image recording section 7 and fixing unit 8, and controls the conveyance of recording paper within the main body 1. A video controller 27, which is connected to an external device (not shown) such as a personal computer by a general-purpose interface (Centronics or RS232C), develops image information sent via the general-purpose interface into bit data and sends the bit data to the engine controller 26 via the signal VDO. A video interface 28 makes possible communication between the video controller 27 and the engine controller 26.

There are cases in which the recording means including the above-described laser scanning section 6, image recording section 7, fixing unit 8 and the recording-paper conveyance path (hereinafter referred to as the "paper path") from the resistance rollers 5 to the paper discharge rollers 12 or optional paper discharge rollers 14 is referred to as a printer engine. Further, there are cases in which the paper path from the resistance rollers 5 to the conveyance rollers 10 is referred to as a common conveyance path.

Optional Units

Various optional units capable of being detachably connected to the main body 1 will now be described.

An optional master unit 32 has a master controller 101 which exercises overall control of a variety of optional units. The master controller 101 is connected to the video controller 27 via a master interface 114 connected via a connector 31. The optional master unit 32 has feed-interrupting conveyance rollers 33 for interrupting conveyance of the recording paper from an optional unit in the paper feed system, a feed-interrupt conveyance path 34, optional paper feed rollers 4 for supplying the interior of the main body 1 with recording paper conveyed by the feed-interrupt conveyance path 34, and discharge-interrupting conveyance rollers 35 for interrupting conveyance of recording paper to an optional unit in the paper discharge system and a discharge-interrupt conveyance path 36.

A large-capacity paper deck optional unit 40 accommodating recording paper has a paper deck 41 which is raised and lowered. Sheets of recording paper stacked on the deck are supplied using a paper-deck feed roller group 42 as necessary. The optional unit 40 includes feed-interrupting conveyance rollers 38 for interrupting conveyance of the recording paper from another optional unit in the paper feed system, a feed-interrupt conveyance path 44, discharge-interrupting conveyance rollers 45 for interrupting conveyance of recording paper to an optional unit in the paper discharge system, and a discharge-interrupt conveyance path 46. The paper deck optional unit 40 is controlled by a paper-deck controller 102.

A sorter optional unit 50, which has a plurality of paper discharging bins, a first bin 51, a second bin 52, a third bin 53 and a fourth bin 54, assorts and stacks sheets of recording paper that have already been recorded on. The assorting of recording paper in each of the bins is performed by first, second, third and fourth flappers 55, 56, 57 and 58, respectively. The optional unit 50 includes feed-interrupting conveyance rollers 61 for interrupting conveyance of the recording paper from an optional unit in the paper feed system, a feed-interrupt conveyance path 62, discharge-interrupting conveyance rollers 60 for interrupting conveyance of recording paper to another optional unit in the paper discharge system, and a discharge-interrupt conveyance path 59. The sorter optional unit 50 is controlled by a sorter controller 103.

The master controller 101, paper-deck controller 102 and sorter controller 103 are connected by optional-unit interfaces 70 interconnected by connectors 71a, 71b and connectors 72a, 72b. Numerals 71a, 72a, 73a denote identical connectors, and numerals 71b, 72b represent identical connectors. Accordingly, the paper-deck optional unit 40 and sorter optional unit 50 can be interchanged in terms of position.

Figure 3:
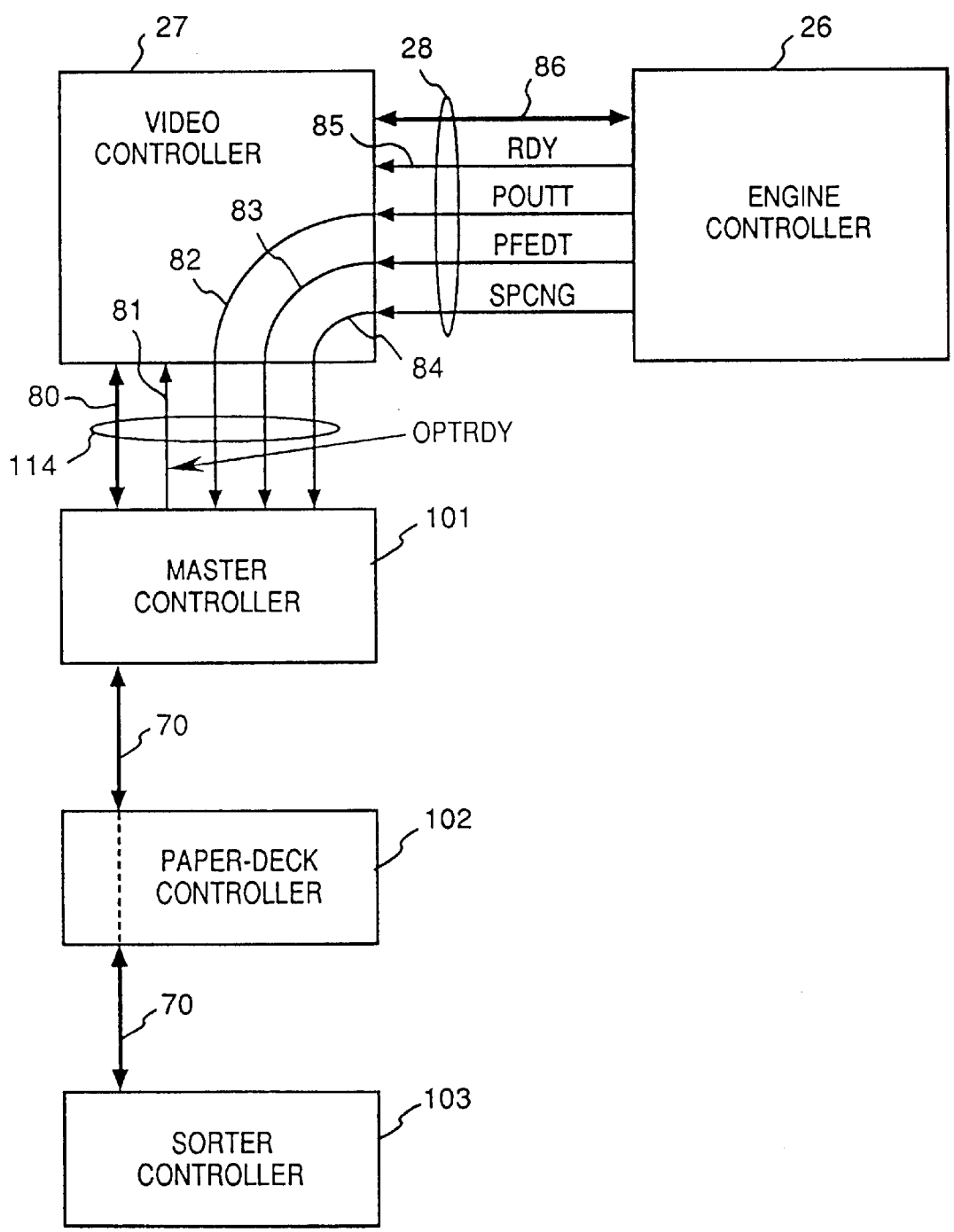
FIG. 3 is a block diagram showing the manner in which each controller in FIG. 2 is connected.

FIG. 3 is a block diagram showing the manner in which each controller is connected.

The master interface 114 is constituted by a serial communication interface 80 and four hardware signals, namely an OPTRDY signal 81, a POUTT signal 82, a PFEDT signal 83 and an SPCNG signal 84.

Commands such as for designating paper feed to the paper-deck optional unit 40 and designating discharge bins for the sorter optional unit 50 are transmitted from the video controller 27 via the serial communication interface 80. Further, various states such as whether or not there is recording paper in the paper-deck optional unit 40, the stacking of paper in each discharge bin of the sorter optional unit 50, etc., are transmitted from the master controller 101 via the serial communication interface 80. It should be noted that the master controller 101 and the video controller 27 can coupled directly by a CPU bus.

The OPTRDY signal 81 indicates whether an option designated by the video controller 27 is in a usable state or not. The POUTT signal 82 is a timing signal indicating the timing at which the main body 1 discharges recording paper. The PFEDT signal 83 is a timing signal indicating the timing at which the main body 1 accepts recording paper from an optional unit. The SPCNG signal 84 is a signal for slowing down the speed of the recording paper, which is conveyed at high speed through the interior of an optional unit, so as to match this speed to the conveyance speed of the main body 1. The three signals POUTT 82, PFEDT 83 and SPCNG 84 are outputted by the engine controller 26, pass through the video controller 27 via the video interface 28 and enter the master controller 101.

Operation

In the arrangement shown in FIGS. 2 and 3, the master controller 101 sends the paper-deck controller 102 a command, via the optional-unit interface 70, requesting information status relating to the length of the paper path and the conveyance speed of the paper-deck optional unit 40. The master controller 101 then obtains this information. Further, the master controller 101 sends the sorter controller 103 a similar command to obtain information relating to the length of the paper path and the conveyance speed of the sorter optional unit 50. It should be noted that these items of information have been stored in a non-volatile memory within each controller.

On the basis of the information thus obtained, the master controller 101 calculates the recording-paper delivery timing of each optional unit and adjusts the timing at which the conveyance rollers of each optional unit are turned on and off.

In a case where a print instruction for feeding paper from the paper-deck optional unit 40 and discharging paper into the sorter optional unit 50 has been issued by the external device (not shown) such as a host computer, the video controller 27 responds to this instruction by instructing the master controller 101, via the serial communication interface, to supply paper from the paper-deck optional unit 40.

Upon receiving this instruction, the master controller 101 instructs the paper-deck controller 102, via the optional-unit interface 70, to pick up and convey recording paper. The recording paper is supplied as a result. Further, the master controller 101 instructs the paper-deck controller 102 to halt conveyance at a timing at which the leading edge of the recording paper arrives at the optional paper feed rollers 4. This timing is calculated from the information relating to the length of the paper path and conveyance speed of the paper-deck optional unit 40.

During this series of operations for supplying paper, the video controller 27 instructs the engine controller 26, via the video interface 28, to begin printing.

Upon receiving this instruction, the engine controller 26 starts the printer engine and then raises the PFEDT signal 83 to logical "1" when the recording paper has been accepted by the main body 1. When the PFEDT signal 83 rises to logical "1", the master controller 101 instructs the paper-deck controller 102, via the optional-unit interface 70, to resume the conveyance of the recording paper.

As a result, the recording paper is advanced forwardly of the optional paper feed rollers 4. When the recording paper is sensed by a sensor 30, the engine controller 26 raises the SPCNG signal 84 to logical "1". When this is done, the master controller 101 instructs the paper-deck controller 102, via the optional-unit interface 70, to change the conveyance speed of the recording paper in order to make the conveyance speed of the recording paper in the paper-deck optional unit 40 agree with the conveyance speed of the recording paper in the main body 1. The reason for this is to raise through put by conveying the recording paper at high speed up to a point just short of the resistance rollers and to assure that printing by the main body 1 will be performed correctly by making all of the recording paper conveyance speeds inclusive of the conveyance speeds of the optional units agree with the recording paper conveyance speed of the main body 1 at the moment the recording paper engages the resistance rollers 5.

The recording paper thus supplied undergoes image transfer at the image forming section 7 and image fixation at the fixing unit 8, after which the leading edge of the recording paper is sensed by a paper discharge sensor 29. When the sensor 29 senses the recording paper, the engine controller 26 raises the POUTT signal 82 to logical "1". When this is done, the master controller 101, via the optional-unit interface 70 and after a prescribed period of time, instructs the sorter controller 103 to operate flappers so as to send the recording paper to the prescribed bin, and instructs the paper-deck controller 102 to operate the discharge-interrupting conveyance rollers 45.

The POUTT signal 82 is raised to logical "1" at the timing at which the paper discharge sensor 29 senses the recording paper because the paper discharge path branches ahead of the sensor 29. In other words, sensors are provided in the vicinity of respective paper discharge ports and a problem arises in a case where the POUTT signal 82 is raised to logical "1" at the detection timings of these sensors. For example, if the conveyance path (path B) from the fixing unit 8 to the paper discharge rollers 12 is longer than the conveyance path (path A) from the fixing unit 8 to the optional paper discharge rollers 14, as shown in FIG. 2, a second sheet of recording paper will arrive at the paper discharge port first, via path A, while a first sheet of recording paper is passing through path B. Accordingly, though a paper discharge signal is outputted by the sensor in the vicinity of the paper discharge port at this time, this signal is that for the second sheet of recording paper. Since the order of the discharged sheets is thus reversed, it is necessary to use the detection timing of the sensor situated in the vicinity of the end of the common conveyance path.

The above-described paper supply operation and paper discharge operation basically are executed by having the video controller 27 verify, based upon the RDY signal 85 outputted by the engine controller 26, that the printer engine is capable of printing, and verify, based upon the OPTRDY signal 81 outputted by the master controller 101, that the optional units are capable of operating. However, in a case where the OPTRDY signal 81 is logical "1" and the RDY signal 85 is at logical "0", the video controller 27 verifies the status of the printer engine via the serial communication interface 86. If a problem such as failure to load the toner cartridge is not found, the operation for feeding paper from the paper-deck optional unit 40 is executed and the recording paper is stopped just before it is fed into the interior of the main body 1. Thus, the recording paper can be supplied to the main body 1 promptly at the moment the RDY signal 85 attains the "1" logic level.

Optional-unit interface

FIG. 4 is a block diagram showing the detailed connections between the master controller 101 and the controller of each optional unit.

The master controller 101 shown in FIG. 4 is an eight-bit single-chip microcomputer. Numerals 104, 105 denote shift registers of eight bits, for example, for commands, and numerals 106 denote shift registers of eight bits, for example, for status. CPUs 108, 109 such as single-chip microcomputers control the operation of the respective optional units. Numeral 110 denotes a serial signal line Tx for commands, 111 a signal line for a signal-transmission clock CLK, 112 a signal line for a data-acceptance strobe signal STB, and 113 a serial signal line Rx for status. Information and status outputted in response to commands from the master controller 101 are stored beforehand in ROMs incorporated within the CPUs 108, 109.

The connection and operation of each block will now be described.

Figure 5A:
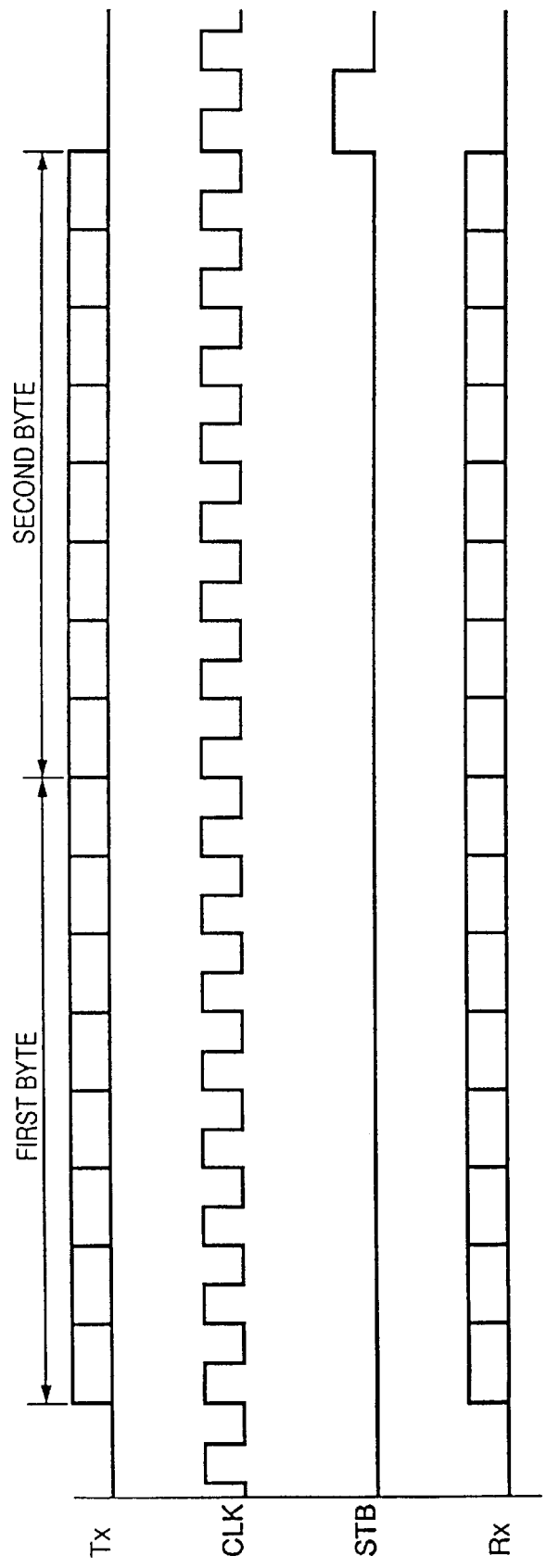
FIG. 5A is a timing chart showing the manner in which data is transferred in FIG. 4.

The master controller 101 outputs commands for the optional units to the signal line Tx 110 serially connected to the shift registers 104 and 105. The status from the optional units enters the master controller 101 via the signal line Rx 113 serially connected to the shift registers 106, 107. The shift registers shift the stored data simultaneously in synchronism with the clock CLK sent from the master controller 101 via the signal line 111. FIG. 5A is a timing chart showing the details.

Two bytes of data are required in order for data to be exchanged between the optional units and the master controller 101. The data is divided into 16 periods by the clock CLK. When the transmission of two bytes of data ends, the master controller 101 issues the strobe signal STB. In response to the strobe signal STB, the CPUs 108, 109 accept the commands from the shift registers 104, 105 via parallel signal lines 115, 116, respectively, and load status representing the states of the units in the shift registers 106, 107 via parallel signal lines 117, 118, respectively. The status is transferred to the master controller 101 by the following clock pulse CLK.

FIG. 5B is a timing chart showing another way of applying the strobe signal STB. Specifically, when the strobe signal STB is at the "0" logic level, loading from the CPUs 108, 109 to the shift registers 106, 107 is enabled. When the strobe signal STB is logical "1", loading from the CPUs 108, 109 is disabled because the data is in the process of being moved. When the strobe signal STB changes from logical "1" to logical "0", storage from the shift registers 104, 105 to the CPUs 108, 109 is enabled. If this arrangement is adopted, one strobe signal STB can be used in an effective manner.

The master controller 101 includes an internal RAM 131 having a memory area for communication with the optional units. Commands and status sent and received in synchronism with the clock signal enter and exit via the memory area in real-time, thereby making high-speed communication possible. If a maximum of ten optional units can be connected, by way of example, the memory area will have a capacity of 20 bytes since two bytes are required for each optional unit to performed transmission and reception.

By virtue of the construction set forth above, simultaneous, high-speed transmission and reception of command and status is made possible between a plurality of optional units and the master controller 101.

By repeating the transmission and reception of command and status periodically at a period of, say, 10 ms, the master controller 101 may ascertain the status of each optional unit at all times.

Resetting method

A software resetting method will now be described.

When resetting is carried out, the master controller 101 sends a reset command to each of the optional units. However, at the time of hardware reset, such as when power is turned on, there is a high probability that the shift-register value will be 00 h or FFh, and therefore a value having a sufficiently low probability at the time of hardware reset, such as a value AAh, is used as the reset command. Otherwise, software reset may be repeated after hardware reset. In addition, 00 h and FFh are made blank commands, namely commands which do not indicate any particular action.

Connection verification method

A method of verifying the connection of the optional units will now be described.

Immediately after power is introduced to the system, the order in which the optional units are connected is unclear. In order to ascertain the order, the master controller 101 executes a check of the connections immediately after the resetting operation. FIG. 6 is a flowchart illustrating the procedure for checking connections. This procedure is executed by the master controller 101 after hardware reset, such as when power is turned on.

As shown in FIG. 6, the resetting operation is executed at step S1, after which connection verification commands are issued at step S2 in a number equivalent to the number of maximum connectable optional units. For example, if the maximum number of connectable optional units is ten but only two optional units are actually connected, as illustrated in FIG. 2, then commands for eight units flow out from the optional units and commands for the remaining two units remain in the shift registers 104, 105.

Next, at step S3, the CPU of each optional unit analyzes the command and waits (several nanoseconds) for the end of preparations for output of status. A blank command is issued at step S4 and status is sent from the shift registers 106, 107 is stored in the memory area for communication at step S5.

The status of an optional unit which responds to the connection verification command contains, in coded form, information indicating the characteristics of the optional unit, namely whether the unit is a paper supply device or paper discharge device, the number of paper supply cassettes and the number of sorting bins, etc. This information is read out of the communication memory area and decoded, whereby the type of optional unit and the order in which it is connected can be verified.

This checking of the connections is performed periodically at a prescribed period. One reason for this is to prevent erroneous verification due to noise. Another reason is to deal with cases in which the user recombines optional units while leaving the power supply turned on, or in which the power supply of an unused optional unit has been turned off.

Thus, in accordance with this embodiment, a wide variety of optional units can be connected without raising the cost of the main body of the image recording apparatus. Even if a plurality of optional units are combined, it is unnecessary for the user to know the order in which the units have been connected. Furthermore, since the optional master unit controls the conveyance of the recording paper, the main body of the image recording apparatus is freed from control of the conveyance of recording paper to the plurality of optional units. This makes it possible to use a variety of optional units freely in any combination without restrictions being imposed by the functions of the engine controller.

Further, by virtue of the fact that the master controller obtains information indicative of path length and conveyance speed relating to the feed and discharge of paper in each optional unit, each unit can be controlled at the optimum conveyance timing. Furthermore, the master controller controls the paper supply operation on the basis of the signal, which is obtained from the engine controller, indicating that feed of paper to the main body is possible, as well as the timing signal for changing over the conveyance speed of the recording paper in an optional unit to the conveyance speed of the recording paper in the printer engine, thereby making it possible to supply paper at a high speed. This makes it possible to increase thru put.

In addition, the master controller obtains a signal indicative of paper feed timing from a sensor situated near the terminus of the common conveyance path of the printer engine, thereby enabling the paper discharge operation of be controlled at an accurate timing.

Furthermore, the engine controller and master controller respectively output ready signals (RDY, OPTRDY) indicative of their respective states, and these signals are monitored by the video controller, thereby making it possible to supply and discharge recording paper accurately.

First Modification

As set forth above, paper is supplied from the paper-deck optional unit 40. In a first modification, it is so arranged that the master controller 101 raises the OPTRDY signal 81 to logical "0" upon judging that a prescribed number of sheets of recording paper reside in the paper path within an optional unit when the video controller 27 issues the next paper feed command to the master controller 101. Accordingly, the video controller 27 will not issue the next paper feed command until the OPTRDY signal 81 attains the "1" logic level. If this arrangement is adopted, the video controller 27 will be capable of monitoring the state of conveyance of the recording paper inside the optional unit, thereby making it possible to prevent jamming and overlapping feed of recording paper in the optional unit.

Second Modification

Figure 7:
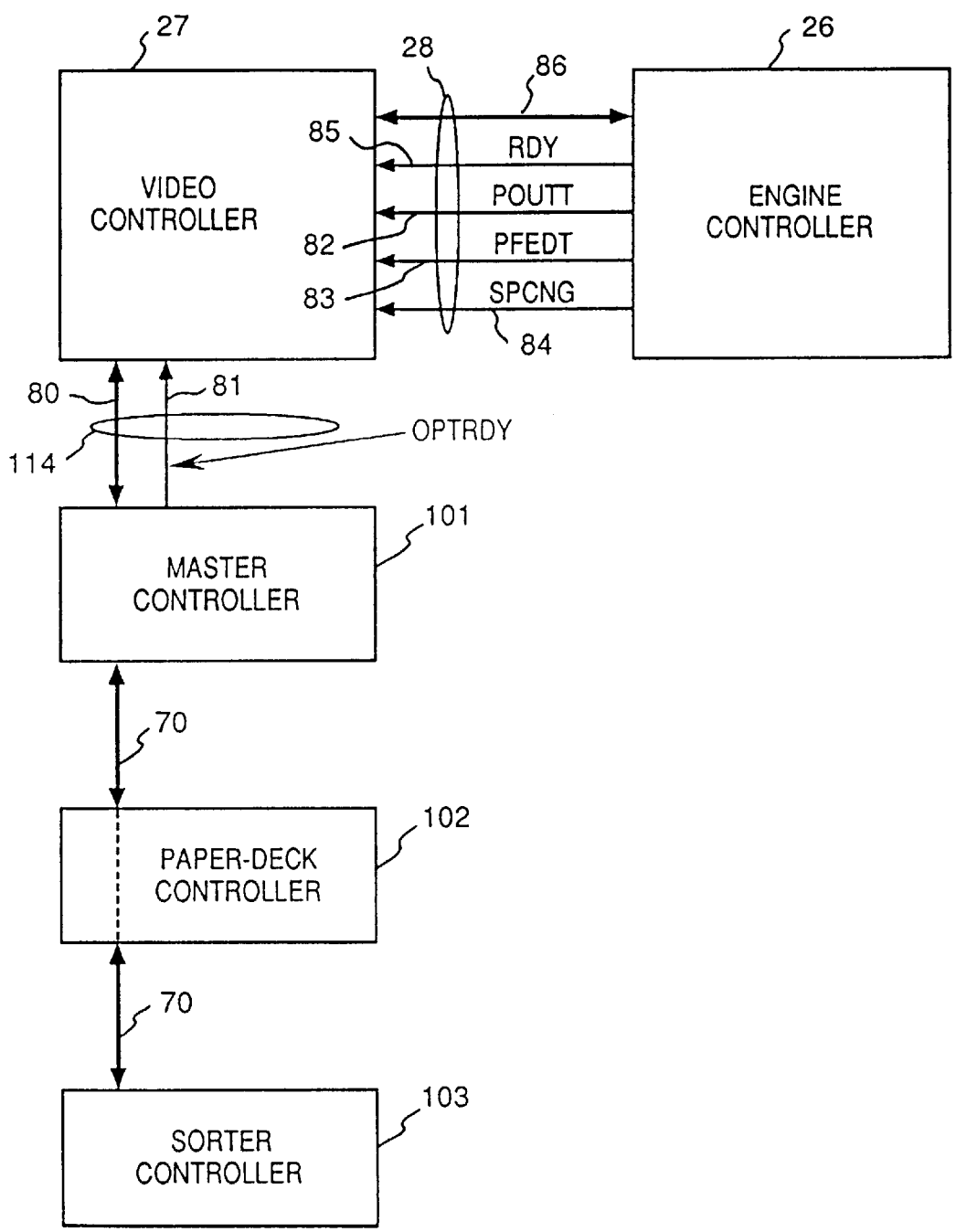
FIG. 7 is a block diagram showing another manner of connecting each controller of FIG. 2 in a second modification.

FIG. 7 is a block diagram illustrating another example of a manner of connecting each controller. Here the POUTT signal 82, PFEDT signal 83 and SPCNG signal 84 issued by the engine controller 26 are temporarily accepted by the video controller 27, which then transmits these signals to the master controller 101 as commands via the serial communication interface 80. Adopting this arrangement makes it possible to simplify the construction of the master interface 114 connecting the video controller 27 and the master controller 101 and to reduce the cost of the main body 1 and optional master unit 32.

Third Modification

Figure 8:
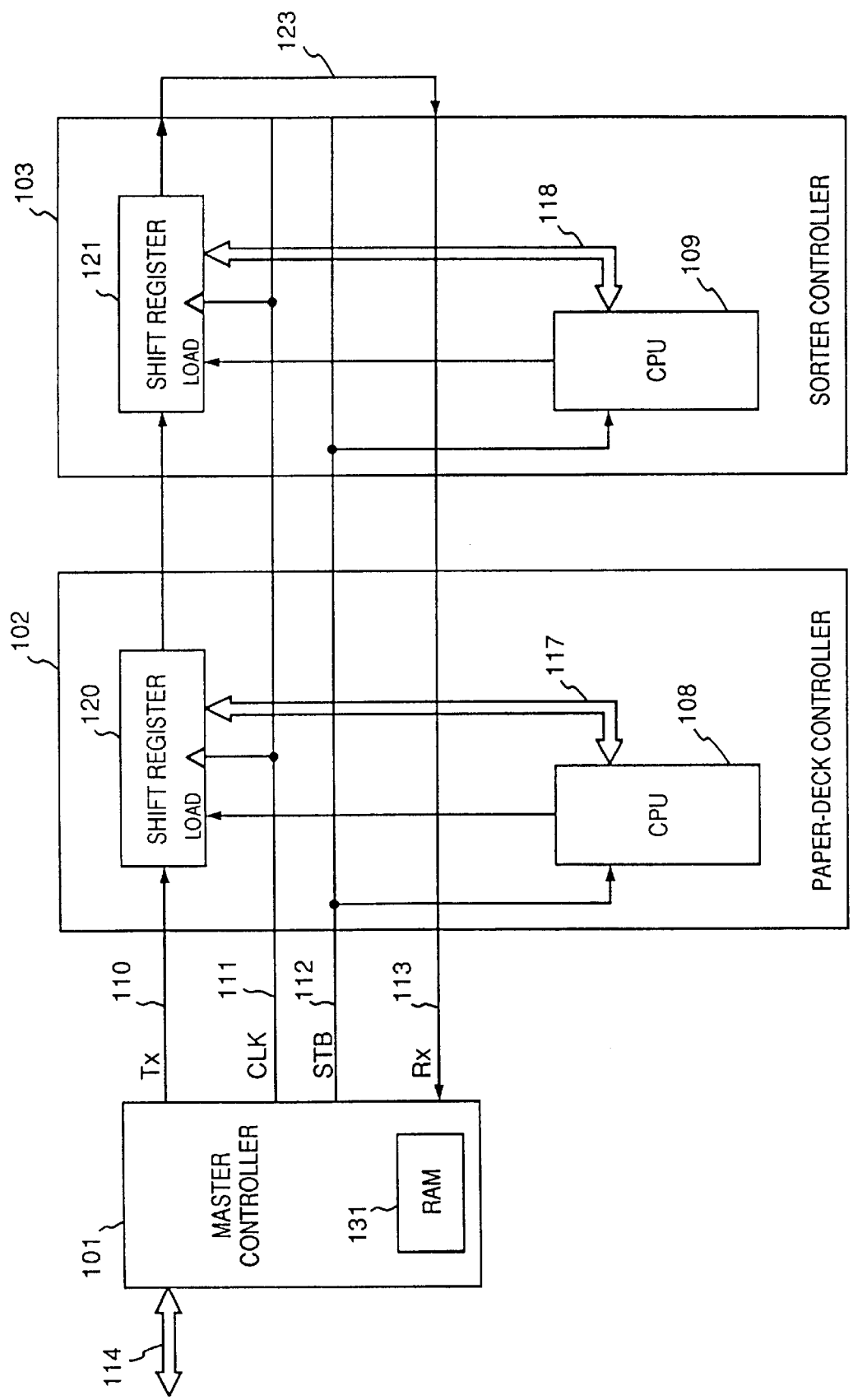
FIG. 8 is a block diagram showing another method of connecting a master controller and the controller of each optional unit in a third modification.

FIG. 8 is a block diagram showing another method of connecting the master controller 101 and the controller of each optional unit. This method of connection differs from that shown in FIG. 4 in that the shift registers are used for both sending and receiving. Here shift registers 120, 121 are parallel-loading, parallel-output shift registers of eight bits, by way of example. Furthermore, the end of the signal line Tx is connected to the signal line Rx by a jumper line 123. By adopting this arrangement, status which the CPUs 108, 109 have loaded in the registers 120, 121 is transmitted through the signal line Rx in synchronism with the clock CLK, and commands enter the vacant bits of the registers 120, 121 from the signal line Tx. Accordingly, the timing chart is the same as that shown in FIG. 5A.

If this arrangement is adopted, effects similar to those of the above-described embodiment are obtained. Moreover, when optional units are combined, the jumper 123 must be attached to the connector at the terminus but the number of component parts of the optional units is reduced. This makes it possible to reduce the cost of the optional units.

Fourth Modification

Figure 9:
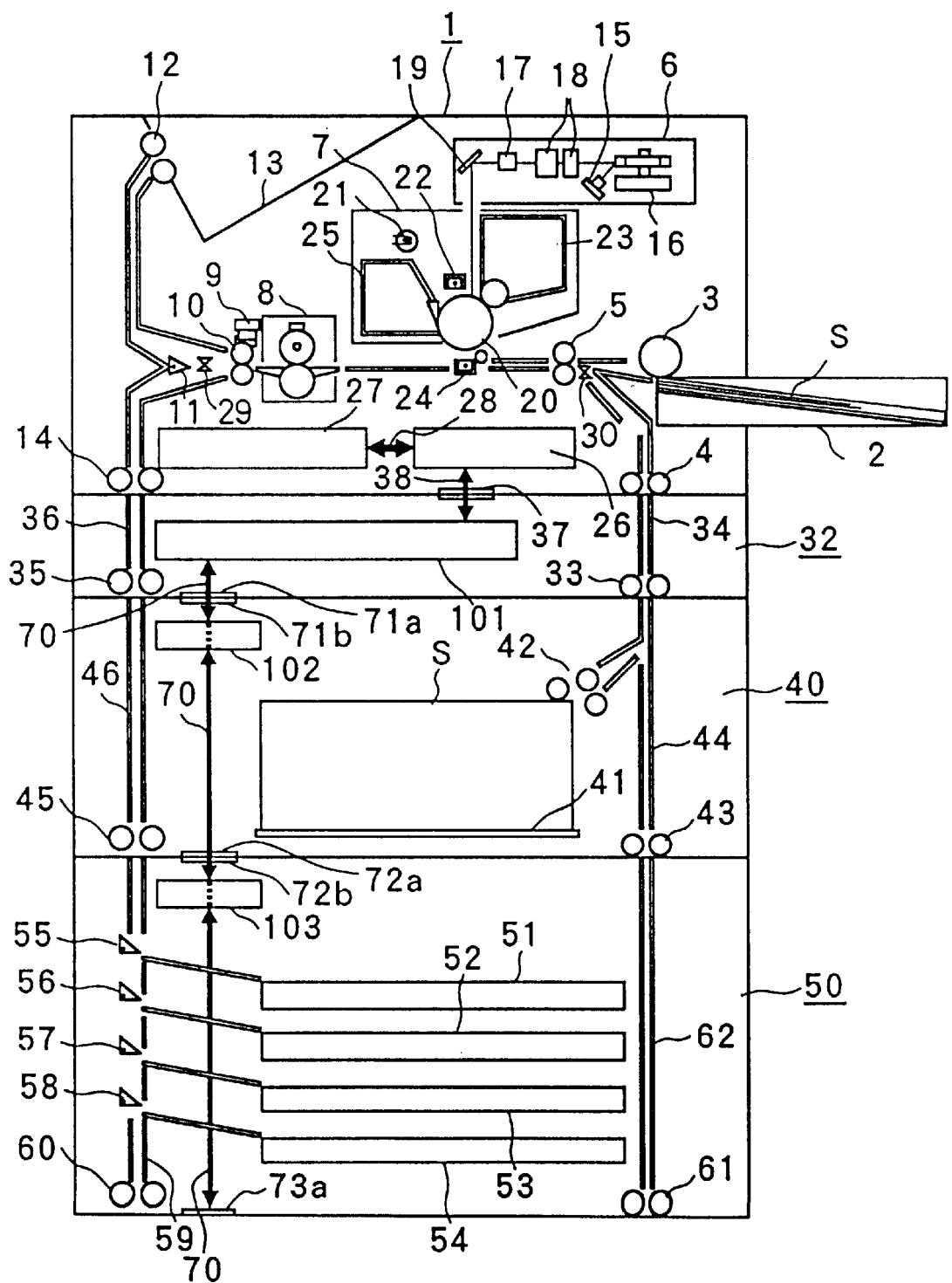
FIG. 9 is a diagram showing the construction of an image recording apparatus according to a fourth modification.
Figure 10:
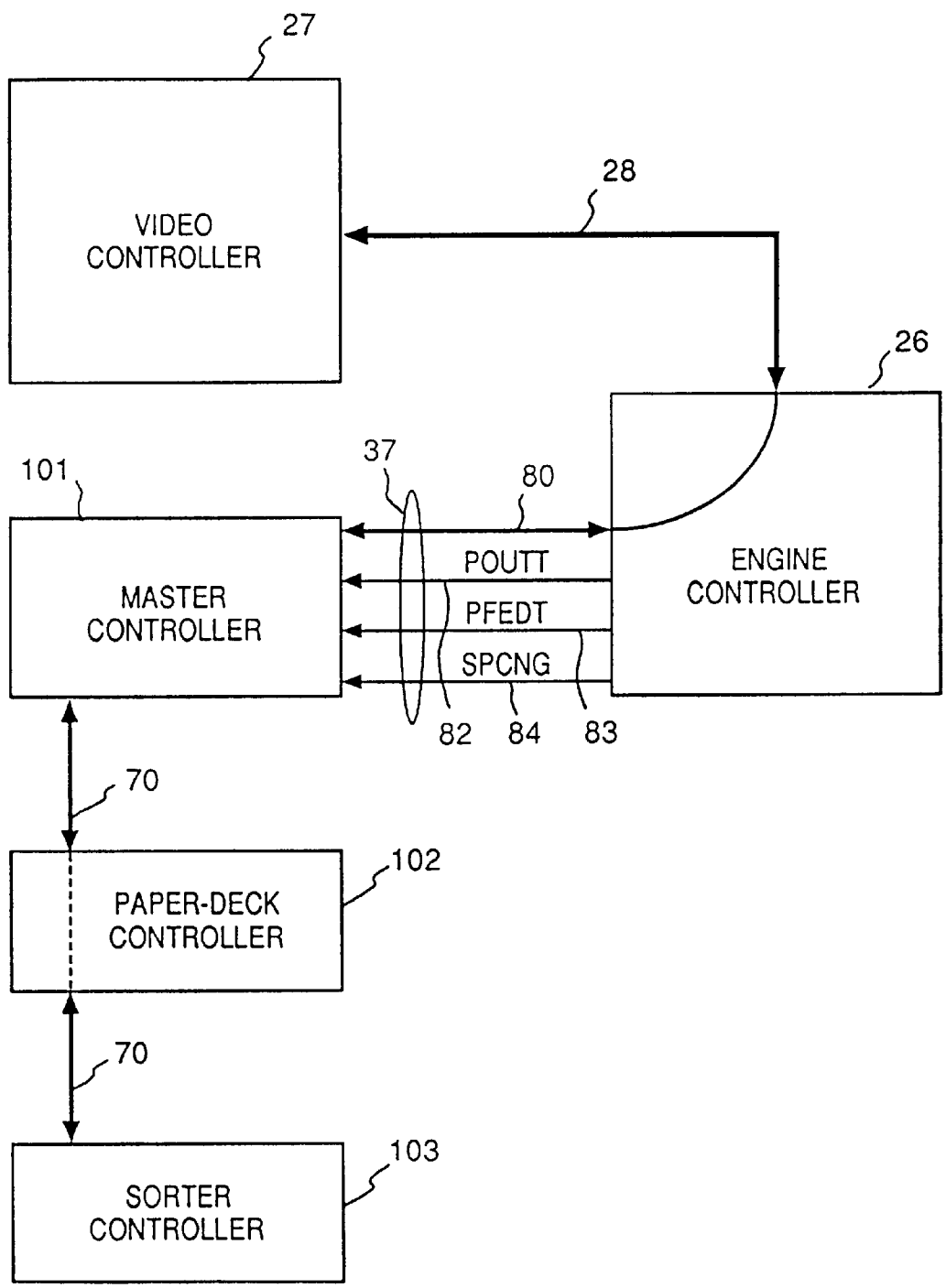
FIG. 10 is a block diagram showing the manner in which each controller in FIG. 9 is connected.

FIG. 9 is a diagram showing the construction of an image recording apparatus according to a fourth modification, and FIG. 10 is a block diagram showing the manner in which each controller in FIG. 9 is connected. This arrangement differs from that of the above-described embodiment in that an interface is not provided between the video controller 27 and the master controller 101. Rather, a master interface 38 connected by a connector 37 is provided between the engine controller 26 and the master controller 101.

In a case where the video controller 27 transmits an instruction destined for the master controller 101 to the engine controller 26 via the video interface 28 and the engine controller 26 judges that the instruction received from the video interface 28 is destined for the master controller 101, the engine controller 26 transfers this instruction to the master controller 101 as is via the serial communication interface 80. Conversely, the engine controller 26 transfers the status received from the master controller 101 to the video controller 27 as is via the video interface 28. As a result, the video controller 27 is capable of controlling the master controller 101 directly.

Further, each of the hardware signals POUTT, PEFDT and SPCNG is coupled directly to the master controller 101 from the engine controller 26. The function of the OPTRDY signal, however, is included in the status of the serial communication interface 80.

If this arrangement is adopted, effects similar to these of the above-described embodiment are obtained. Moreover, even if the connection between the video controller and the master controller is physically difficult, the video controller and the master controller can be connected via the engine controller.

Fifth Modification

Figure 11:
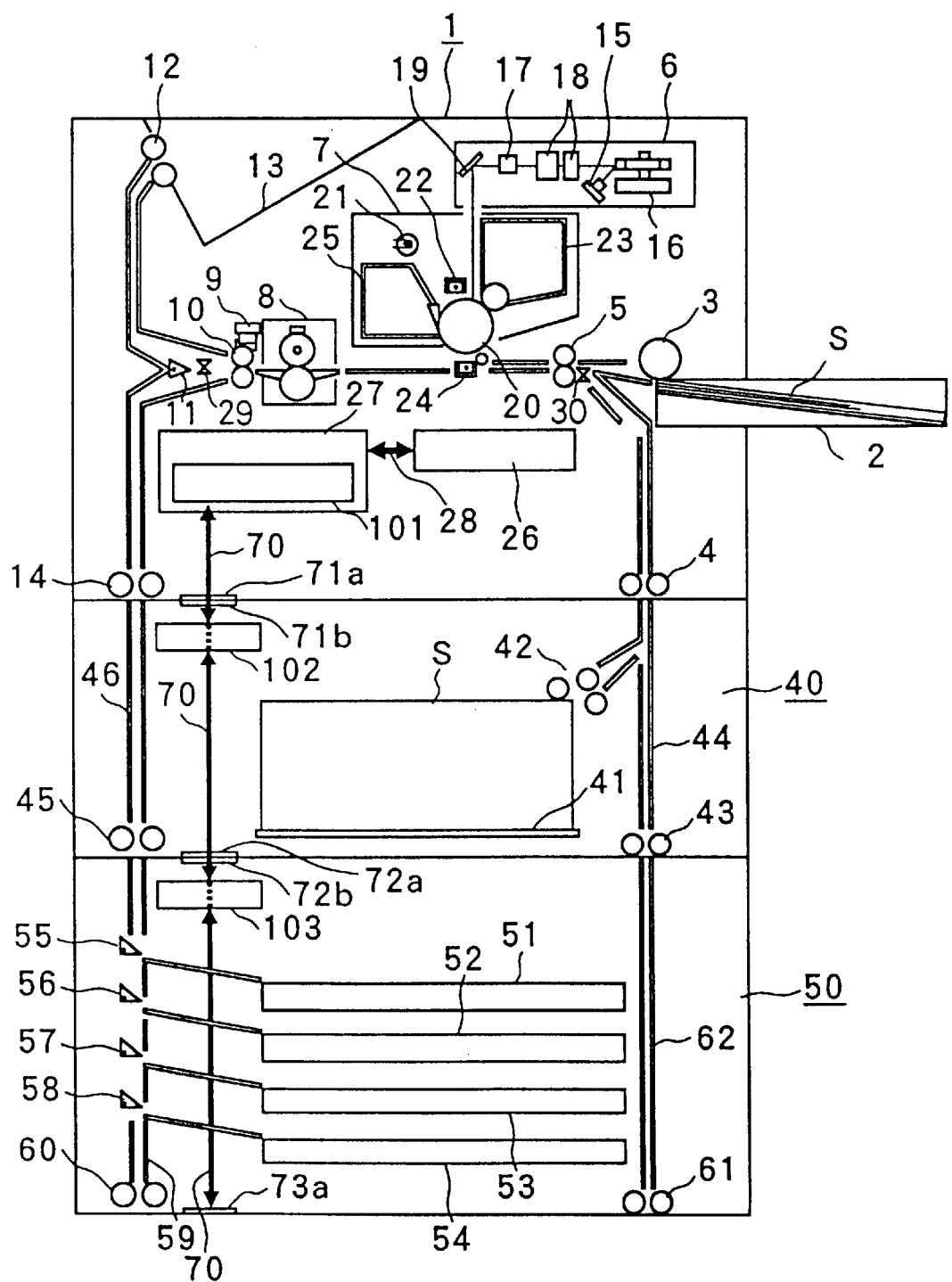
FIG. 11 is a diagram showing the construction of an image recording apparatus according to a fifth modification.
Figure 12:
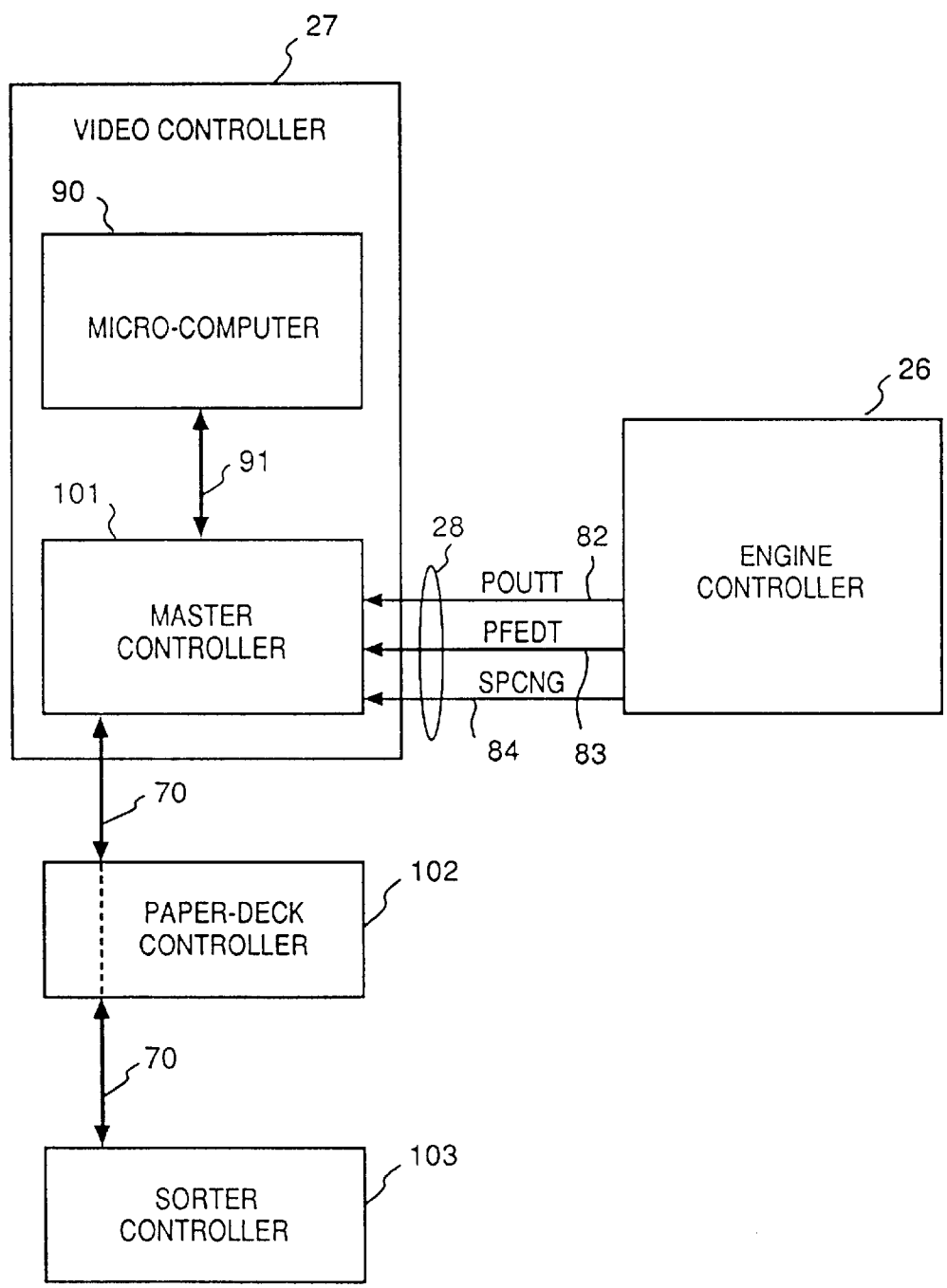
FIG. 12 is a block diagram showing the manner in which each controller in FIG. 11 is connected.

FIG. 11 is a diagram showing the construction of an image recording apparatus according to a fifth modification, and FIG. 12 is a block diagram showing the manner in which each controller in FIG. 11 is connected. This modification differs from the above-described embodiment in that the master controller 101 is provided within the video controller 27. In this case, a microcomputer 90, which is the main control of the video controller 27, and the master controller 101 are connected by a bus line 91. As a result, communication between the video controller 27 and the master controller 101 can be made high in speed.

Further, each of the hardware signals POUTT, PEFDT and SPCNG is coupled directly to the master controller 101 from the engine controller 26. The function of the OPTRDY signal, however, is included in the communication performed by the bus line 91.

If this arrangement is adopted, effects similar to those of the above-described embodiment are obtained. Moreover, in the case of an apparatus which the user knows will have an optional unit connected thereto, it is unnecessary to independently provide an optional master unit. This makes it possible to lower the cost of the overall system.

Sixth Modification

Figure 13:
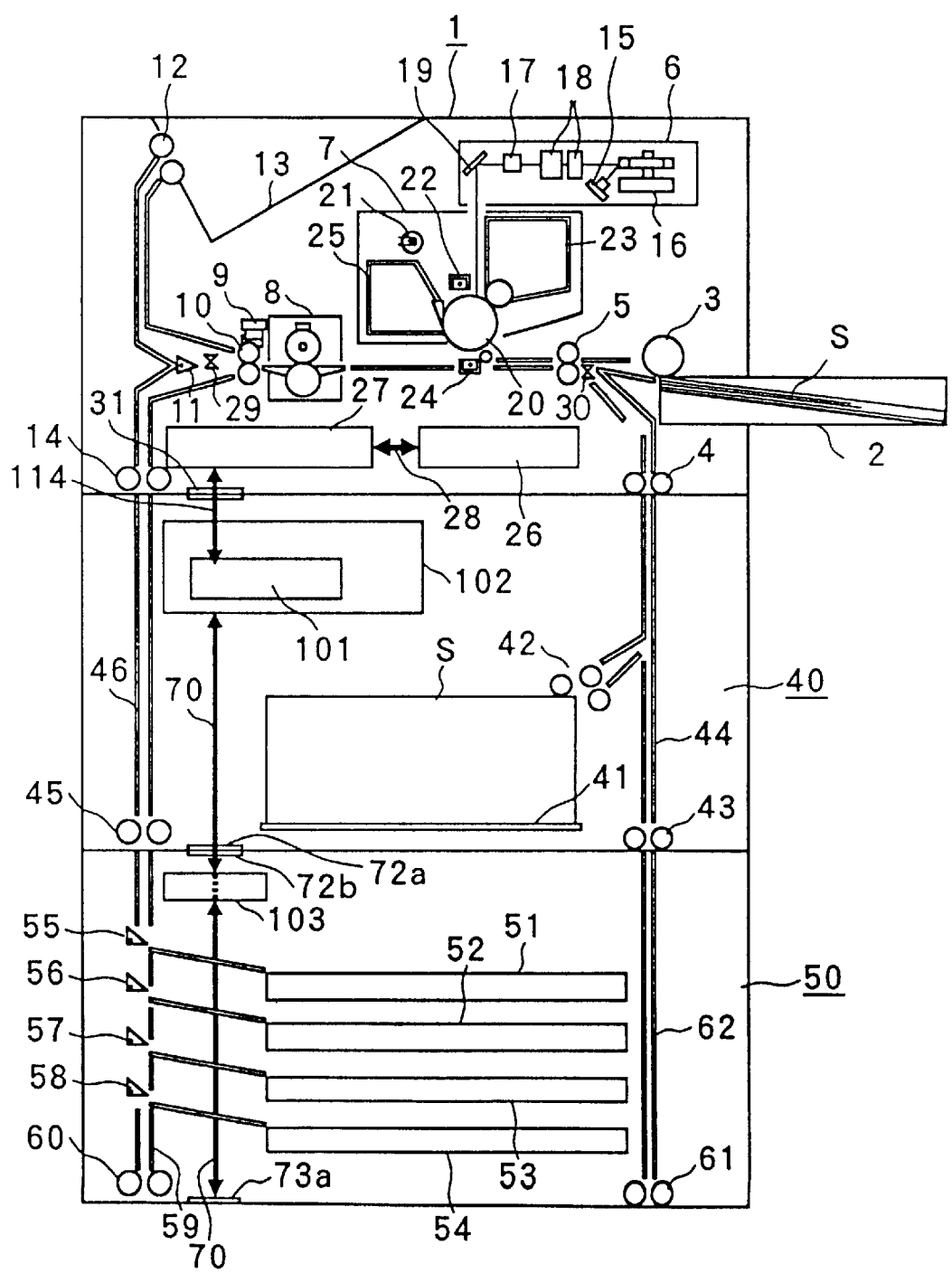
FIG. 13 is a diagram showing the construction of an image recording apparatus according to a sixth modification.
Figure 14:
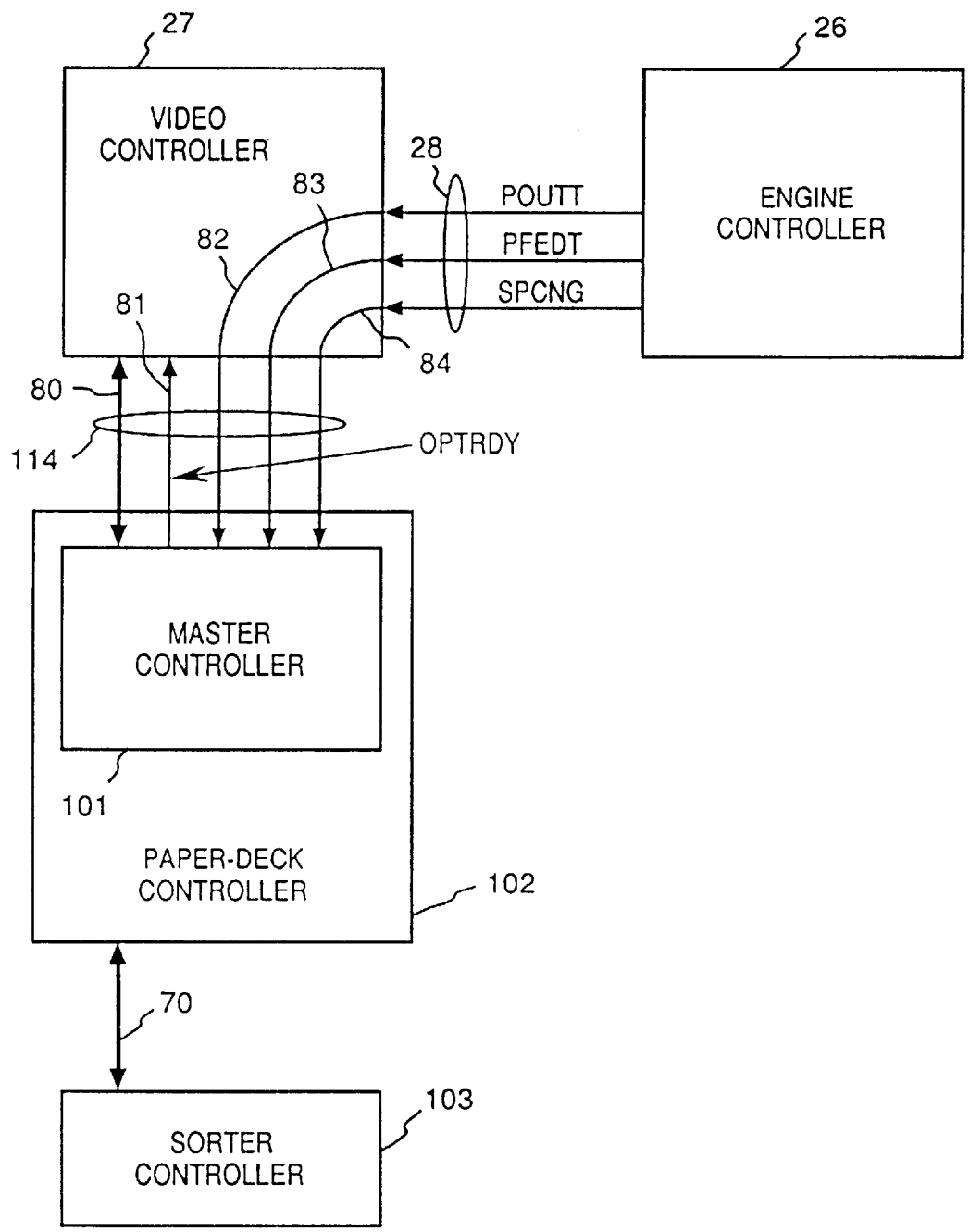
FIG. 14 is a block diagram showing the manner in which each controller in FIG. 13 is connected.

FIG. 13 is a diagram showing the construction of an image recording apparatus according to a sixth modification, and FIG. 14 is a block diagram showing the manner in which each controller in FIG. 13 is connected. This modification differs from the above-described embodiment in that the master controller 101 is provided within the control of a specific optional unit. FIG. 13 illustrates an example in which the master controller is provided within the paper-deck controller 102.

If this arrangement is adopted, effects similar to these of the above-described embodiment are obtained. Moreover, in a case where the user knows the optional unit that will be connected, it is no longer necessary to independently provide an optional master unit. This does not lead to an increase in the cost of the main body of the image recording apparatus and makes it possible to lower the cost of the overall system.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   a main body having a printer engine which forms an image on a recording medium;
   a supply unit supplies the recording medium to said main body; and
   a discharge unit receives the recording medium, on which an image is recorded, discharged from said main body,
   wherein said supply unit and discharge unit detachably connect to said apparatus and said units are stackable under said main body, and said supply unit and discharge unit have a relaying means for relaying the recording medium which is supplied or discharged from another unit or said main body.

2. The apparatus according to claim 1, wherein said stacked supply unit and discharge unit can be interchanged in conditions of position.

3. The apparatus according to claim 1, conveying speed of the recording medium supplied from said supply unit is changed to conveying speed for said main body.

4. The apparatus according to claim 1, further comprising determining means for determining whether or not allowing supply of the recording medium by said supply unit when a state of said printer engine is unready for forming an image.

5. The apparatus according to claim 1, wherein said supply unit and discharge unit are stacked so as to form paths for supplying and discharging the recording medium along two sides of said apparatus which are opposite.

* * * * *

UNITED STATES PATENT AND TRADEMARK OFFICE
CERTIFICATE OF CORRECTION

PATENT NO. : 6,204,872 B1  Page 1 of 1
DATED : March 20, 2001
INVENTOR(S) : Hiroshi Hashimoto et al.

It is certified that error appears in the above-identified patent and that said Letters Patent is hereby corrected as shown below:

Column 1,
Line 5, "Division" should read -- division --.

Column 6,
Line 53, "through put" should read -- throughput --.

Column 9,
Line 56, "thru put" should read -- throughput --; and
Line 60, "of" should read -- to --.

Column 12,
Line 21, "supplies" should read -- for supplying --;
Line 23, "receives" should read -- receiving --;
Line 34, "conveying" should read -- wherein a conveying --; and
Line 38, "allowing" should read -- to allow --.

Signed and Sealed this

Eighth Day of January, 2002

*Attest:*

*Attesting Officer*

JAMES E. ROGAN
*Director of the United States Patent and Trademark Office*